US012403947B1

(12) United States Patent
Guarista

(10) Patent No.: US 12,403,947 B1
(45) Date of Patent: Sep. 2, 2025

(54) WHEEL ATTACHMENT FOR TAMPER

(71) Applicant: Manuel Guarista, Tucson, AZ (US)

(72) Inventor: Manuel Guarista, Tucson, AZ (US)

( * ) Notice: Subject to any disclaimer, the term of this patent is extended or adjusted under 35 U.S.C. 154(b) by 359 days.

(21) Appl. No.: 17/973,716

(22) Filed: Oct. 26, 2022

(51) Int. Cl.
*B62B 5/00* (2006.01)
*B62B 1/10* (2006.01)
*B62B 5/06* (2006.01)
*E01C 19/35* (2006.01)
*E02D 3/046* (2006.01)

(52) U.S. Cl.
CPC .............. *B62B 5/0083* (2013.01); *B62B 1/10* (2013.01); *B62B 5/06* (2013.01); *B62B 2202/48* (2013.01); *E01C 19/35* (2013.01); *E02D 3/046* (2013.01)

(58) Field of Classification Search
CPC ........... B62B 5/0083; B62B 1/10; B62B 5/06; B62B 2202/48; E01C 19/35; E02D 3/046
See application file for complete search history.

(56) References Cited

U.S. PATENT DOCUMENTS

| 8,128,105 | B2 | 3/2012 | Filiatrault et al. |
| 8,172,240 | B2 * | 5/2012 | Zimmerman ........... E02D 3/074 280/47.131 |
| 9,045,154 | B2 * | 6/2015 | Avery .................. B62B 5/0083 |
| 10,300,936 | B2 | 5/2019 | Breisch |

* cited by examiner

*Primary Examiner* — Bryan A Evans
(74) *Attorney, Agent, or Firm* — Sanchelima & Associates, P.A.; Jesus Sanchelima; Christian Sanchelima

(57) ABSTRACT

A wheel attachment for tamper including a wheeled axle assembly with a handle assembly and tamper assembly. The bottom portion of a tamper assembly is mounted in the wheeled axle assembly. The wheeled axle assembly includes a pair of wheels with a bearing portion attached at the endings of the axle with a couple bearings. The axle includes a fastener base which is located at a center of the axle with a differential opposite distance from the handle and allows to set the tamper therein. The handle assembly include a fastener located in an opposite side from the handle allowing to drive the wheeled axle assembly. The base of the tamper can be inserted through the fastener base and be mounted on the axle.

13 Claims, 5 Drawing Sheets

WHEEL ATTACHMENT FOR TAMPER

BACKGROUND OF THE INVENTION

1. Field of the Invention

The present invention relates to a wheel attachment for tamper and, more particularly, to a wheel attachment for tamper that includes a mobility detachable device with a shaped attachment handle for a tamper to place in.

2. Description of the Related Art

Several designs for a wheel attachment for tamper have been designed in the past. None of them, however, include a detachable dolly wherein a jumping jack can be mounted into a base and can be used as a mobility device to transport over multiple surfaces.

Applicant believes that a related reference corresponds to U.S. Pat. No. 8,128,105 issued for a wheel assembly for providing wheeled transport to a compaction tool having a foot structure. Applicant believes that another related reference corresponds to U.S. Pat. No. 10,300,936 issued for a tamper cart system. However, it differs from the present invention because it includes a mobility attachment device for a tamper comprising an axle with wheels on either end, or a pair of attachment arms for removably attaching the mobility device to the body of a tamper.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a wheel attachment for tamper that includes a wheeled axis to easily move over multiple surfaces.

It is another object of this invention to provide wheel attachment for tamper that includes a handle which can be used as a direction device.

It is still another object of the present invention to provide wheel attachment for tamper that includes an axle to mount a tamper device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
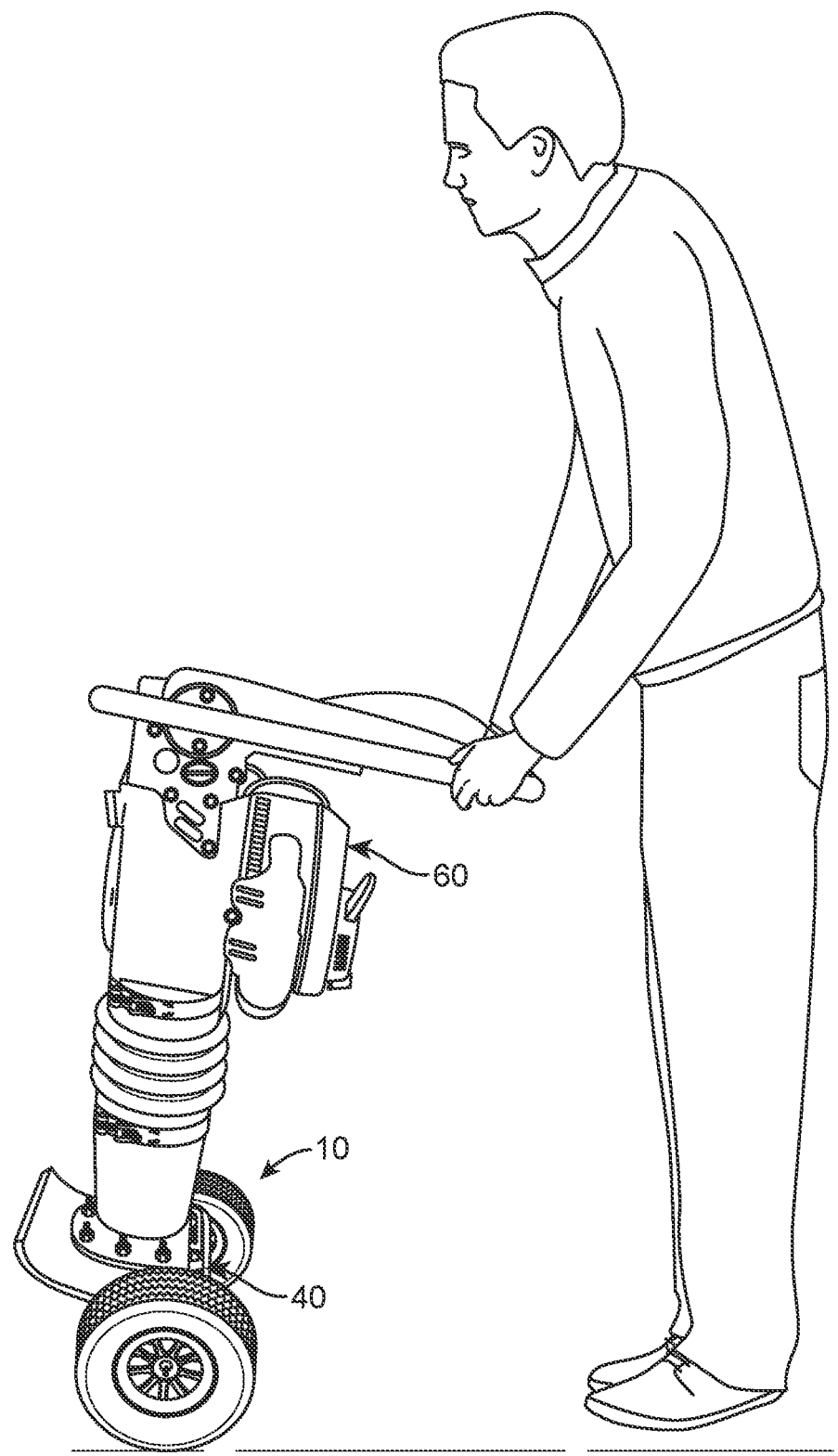
FIG. 1 represents an operational view wherein a user is moving a tamper assembly 60 that is mounted to the present invention 10.

Referring now to the drawings, where the present invention is generally referred to with numeral 10, it can be observed that it basically includes a wheeled axle assembly 20, a handle assembly 40 and a tamper assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Wheeled axle assembly 20 includes a wheeled axle 22, bearings 24, a bearing portions 24a wheels 26 and tires 28. In a suitable embodiment wheeled axle 22 may have a half box section body as best observed in FIG. 2 with two thin plate sheets perpendicularly connected through the sides of each of plate sheets that conform the wheeled axle 22. Nevertheless, another other body like tube, pool, hexagon prism, rectangular prism, rod body, pentagonal prism, or any other variation thereof may be suitable to the wheeled axle 22. In a suitable embodiment, the wheeled axle 22 may be suitable to be made of a steel material. Nevertheless, the wheeled axle 22 may be made of a carbon steel material, alloy steel material, metal material, rigid plastic material, or any other variation thereof. In one embodiment the wheeled axle 22 may be a support for tamper assembly 60. In another embodiment the wheeled axle 22 may be a support for handle assembly 40. Both of the bearings 24 may be attached to each of the endings of the wheeled axle 22 through the internal body of bearing 24. In a suitable embodiment, the bearings 24 may have a circular shape. In a preferred embodiment, bearings 24 may be a type of roller bearing G. Nevertheless, it is to be considered that any other type of bearing wheels like plain bore bearing, ball bearing, central ball bearing, two central ball bearings, spherical roller bearing may be suitable for the bearings 24. It is to be considered that the bearings 24 may also be attached to each of the wheels 26. The bearings 24 may be made of a carbon steel. Nevertheless, in other embodiments, the bearings 24 may be made of a stainless steel, carbon steel, tool steel, or any other variation thereof. It is to be understood that the bearings 24 may allow the wheeled axle 22 to roll. The bearing portions 24a may have a circular body as the bearings 24. In a suitable embodiment, the bearing portions 24a may be made of a titanium material to withstand heavy force applied thereof. Nevertheless, it should be considered that other materials like steel, carbon fiber, metal, aluminum allow, casting aluminum or any other variation thereof. In a suitable embodiment, the bearing portions 24a may be a set location for the bearings 24.

It should be considered that bearing portions 24a may be con concentrically attached to the wheels 26. The bearings 24 may be concentrically attached to each one of the bearing portions 24a to attach the wheeled axle 22 to the wheels 26 and the tires 28 In a preferred embodiment the wheels 26 may be attached to the wheeled axle 22 through the bearings 24. The wheels 26 may be made of a cast aluminum alloy wheel material to withstand heavy force applied thereof. Nevertheless, it should be considered that other materials like steel wheels, carbon fiber wheels, metal wheels, steel ring, aluminum allow wheels, casting aluminum or any other variation thereof. The wheels 26 may allow to transport the tamper assembly 60. Both wheels 26 may be attached to each of the sides of the wheeled axle 22. The tires 28 may be mounted to each of the wheels 26. The tires 28 may be made of a synthetic rubber. Nevertheless, in other embodiments the wheels 26 may be made of a butadiene rubber, styrene butadiene rubber material, or any other material thereof. In one embodiment the tires 28 may be a type of all-season tire. Nevertheless, it is to be considered that other different types of tires like touring tires, summer tires, performance tires, highway tires, all-terrain tires, rib tires, spare tires, or any other variation thereof may me suitable for tires 28.

The handle assembly 40 includes a handle 42 and a fastener base 44. It is to be considered that handle 42 may be perpendicularly attached to the wheeled axle 22. In a suitable embodiment, the handle 42 may have a rectangular body as best observed in FIG. 2. Nevertheless, other shapes like linear body, cylindric body curly body, or any other variation thereof. In a suitable embodiment handle the 42 may have a rectangular body defining a hollow rectangle which extends from the wheeled axle 22. Nevertheless, in another embodiment, the handle 42 may have a s-shaped body. In a suitable embodiment, the handle 42 may be a fastener for tamper assembly 60. The handle 42 may be made of a stainless-steel material to withstand when applying any force thereof. Nevertheless, it should be considered that any other material like carbon steel, aluminum alloy, carbon fiber, metal, aluminum, steel, or any other variation thereof, may be suitable for the handle 42. In a preferred embodiment, the handle 42 may be attached on a half side of the wheeled axle 22. Nevertheless, the handle 42 may be attached to a top side, bottom side of the wheeled axle 22.

Figure 2:
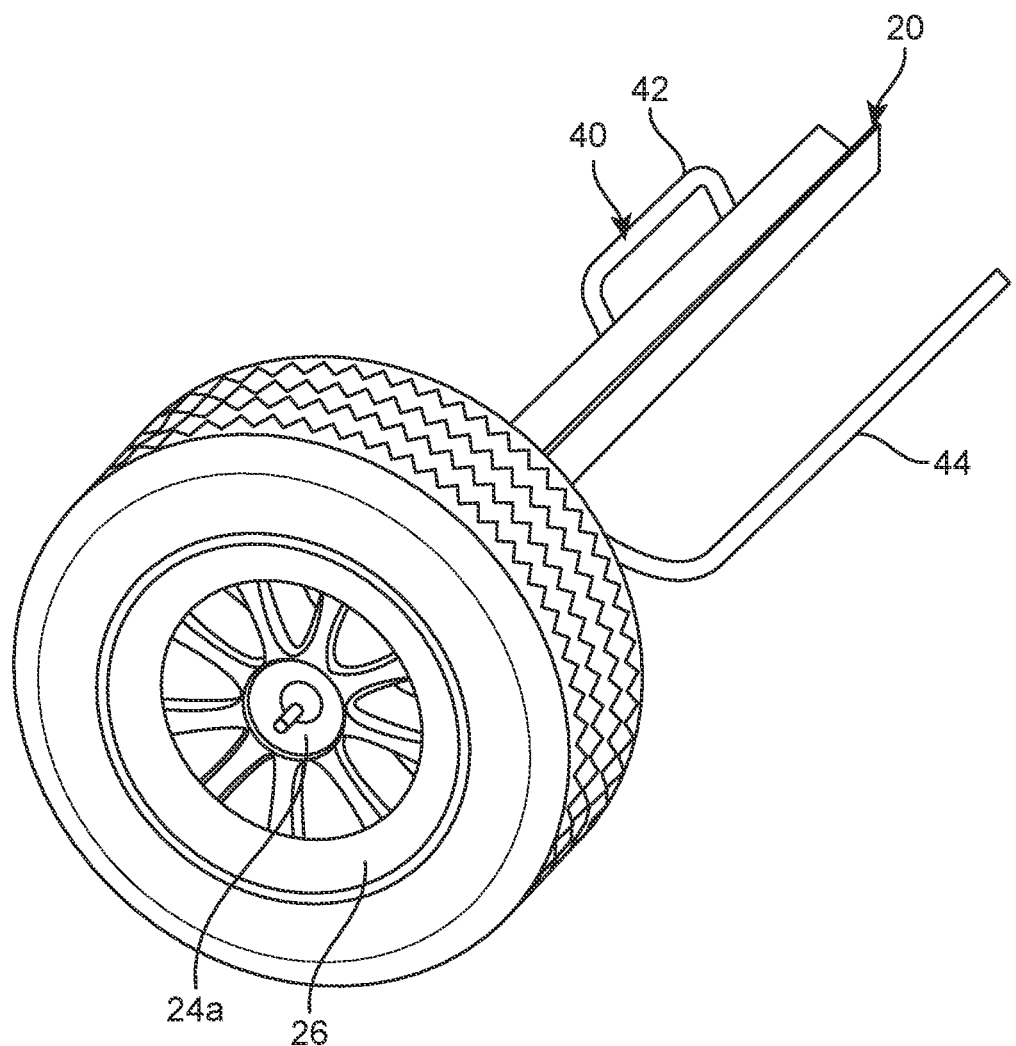
FIG. 2 shows an enlarged perspective view of the handle assembly 40. A handle 42 is attached to wheeled axle assembly 20. Bearing portions 24a are attached to wheels 26.
Figure 3:
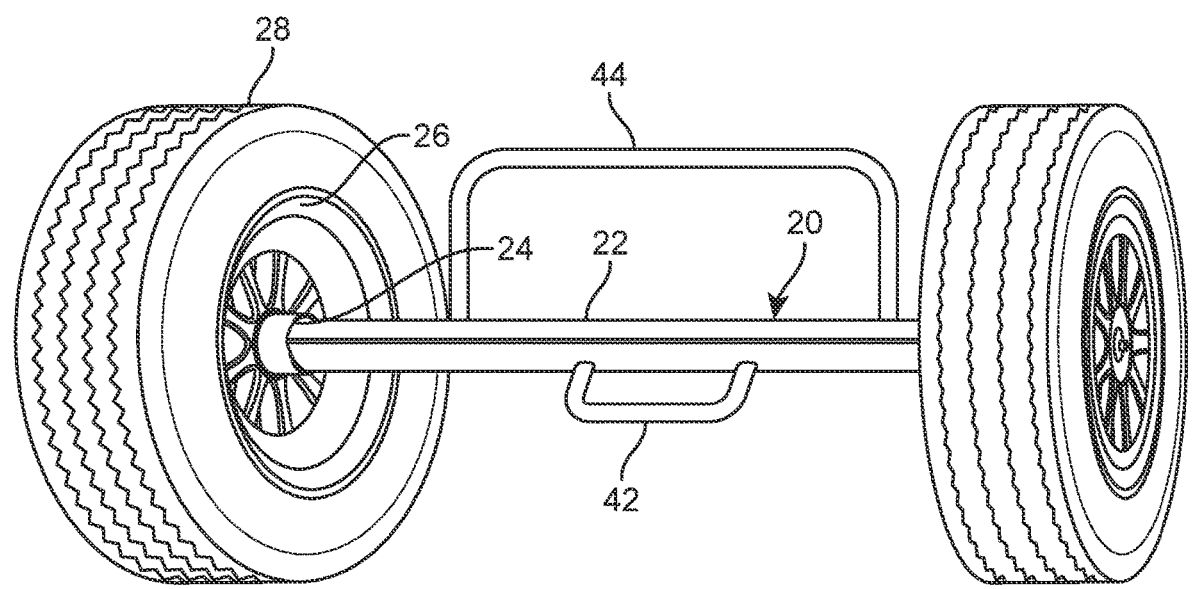
FIG. 3 illustrates a front isometric view of the wheeled axle 22. One of the bearings 24 is attached in at least one of the tires 28 which is placed in each of the wheels 26.
Figure 4:
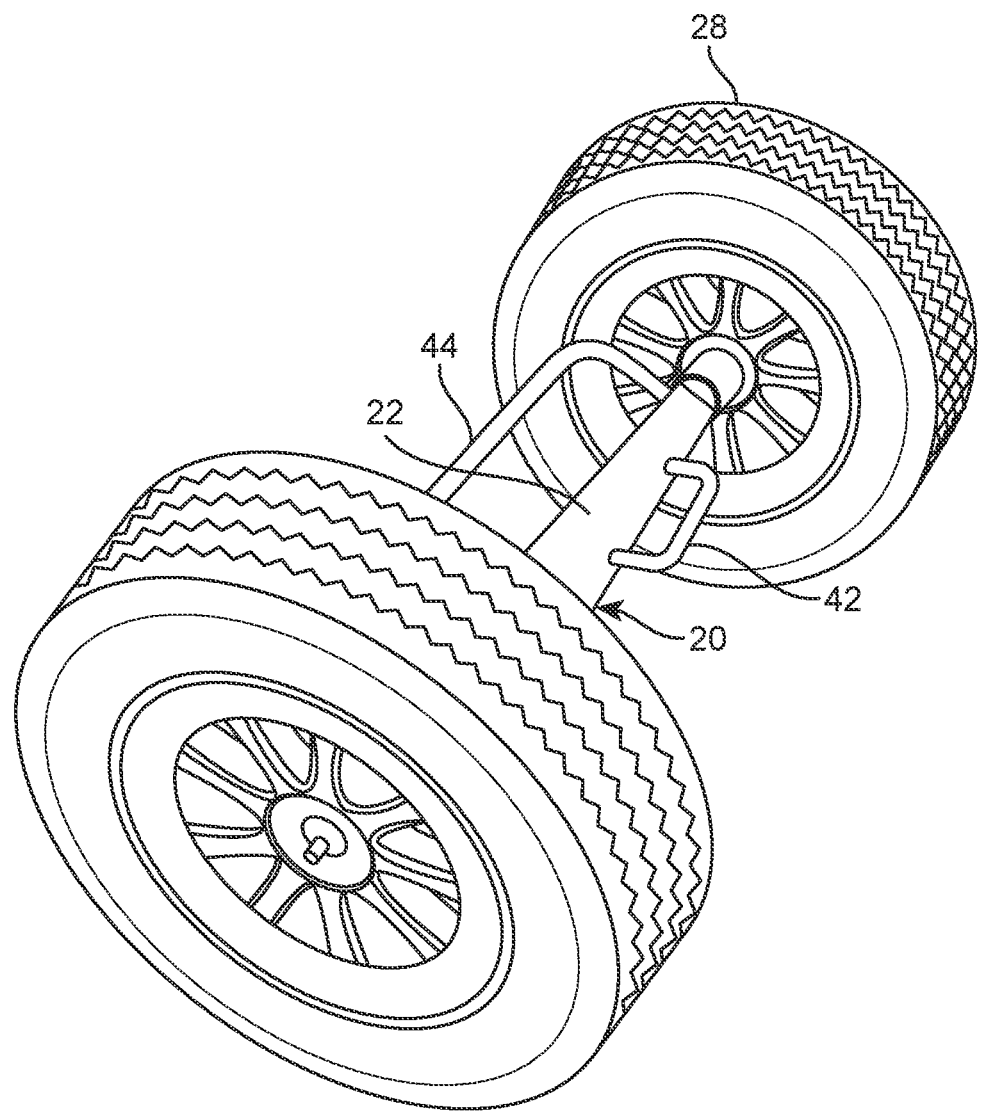
FIG. 4 is a representation of a right perspective view of the wheeled axle assembly 20. Fastener base 44 is attached to wheeled axle 22.
Figure 5:
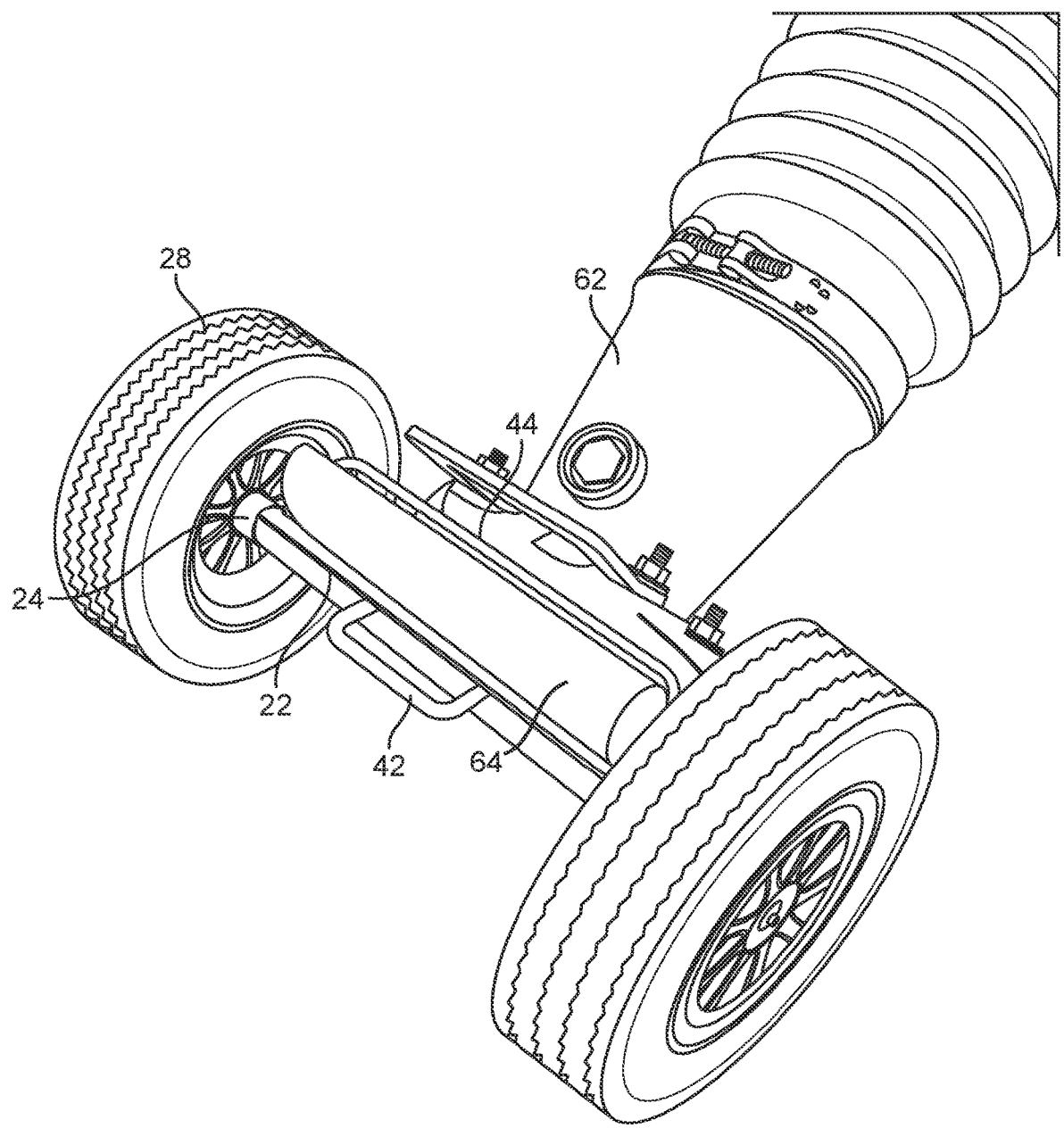
FIG. 5 shows an isometric view of the tamper 62 which is mounted to the axle 22. Bottom portion 64 is inserted through the fastener base 44.

As best shown in FIG. 2, the handle 42 may be attached on a middle section of the wheeled axle 22 parallelly placed with a difference distance between each other. The handle 42 may be configured to drive the tamper assembly 60 by user's feet. In a suitable embodiment, the handle 42 may be attached to the wheeled axle 22 by a welding technique. Nevertheless, in another embodiment, the handle 42 may be attached to the wheeled axle 22 by a riveting technique. The fastener base 44 may be attached opposite to handle 42 wherein fastener base 44 may be perpendicularly attached on wheeled axle 22 referring to handle 42. The fastener base 44 may be made of a steel material. Nevertheless, another material like carbon steel material, alloy steel material, metal material, rigid plastic material, copper material, titanium material or any other variation thereof, may be suitable for the fastener base 44. In one embodiment the fastener base 44 may be a support for the tamper assembly 60. The fastener base 44 may have a hollow rectangular body as best observed in FIG. 4. In other embodiments, the fastener base 44 may have a rectangular base body, triangular base body, or any other variation thereof. The fastener base 44 may be attached to wheeled axle 22 by a welding technique. Nevertheless, in another embodiment a riveting technique may be suitable for the fastener base 44. As best shown in FIG. 1 the fastener base 44 may be attached to a bottom side of the wheeled axle 22. In a suitable embodiment the fastener base 44 may be a support for the tamper assembly 60. In a suitable embodiment, the fastener base 44 may be attached on a middle portion of the wheeled axle 22.

The tamper assembly 60 includes a tamper 62 with a bottom portion 64. It is to be considered that the wheeled axle 22 may be a support for the tamper 62 when inserting a bottom portion through the fastener base 44. In a suitable embodiment, the wheeled axle 22 may be a support with the fastener base 44 to the bottom portion 64 of the tamper 62 wherein the bottom portion 64 is enclosed by the wheeled axle 22 and the fastener base 44.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wheel attachment for tamper comprising:
   a wheeled axle assembly including an axle with a box section body, said wheeled axle including bearings in each distal end thereof to allow to transport a tamper by wheels;
   a handle assembly including a handle, wherein said handle has a rectangular hollow body, said handle extends outwardly from said wheeled axle in a perpendicular configuration, said handle further being a driver for a tamper;
   a tamper assembly including said tamper, wherein said tamper has a bottom portion that is inserted through a fastener base, said tamper being lifted up by said handle;
   wherein said fastener base and said wheeled axle define a rectangular hollow portion into which the bottom portion of the tamper is inserted, and
   wherein the rectangular hollow portion has a configuration matching the tamper bottom portion to securely hold the tamper in position.

2. The wheel attachment for tamper of claim 1, wherein said wheeled axle includes bearings attached on the sides to permit said tamper to be transported.

3. The wheel attachment for tamper of claim 1, wherein said wheeled axle includes wheels attached on the sides thereof.

4. The wheel attachment for tamper of claim 3, wherein said wheels includes bearing portions concentrical to said wheels configured to roll to transport said tamper.

5. The wheel attachment for the tamper of claim 1, wherein said wheeled axle and said fastener base define a rectangular hollow portion.

6. The wheel attachment for tamper of claim 1, wherein said wheeled axle is configured to support said tamper by tires wherein the tamper is inserted through said rectangular hollow portion defined by said fastener base and said wheeled axle.

7. The wheel attachment for tamper of claim 5, wherein at least one of the tires is attached to at least one of the wheels in cooperation with said handle which allow to transport said tamper.

8. The wheel attachment for tamper of claim 1, wherein said handle is attached to said wheeled axle in a center portion and has a rectangular hollow shape which is perpendicular to said fastener base both extending outwardly said wheeled axle.

9. The wheel attachment for tamper of claim 1, wherein said fastener extends from said wheeled axle by a pair of distal ends defining a rectangle configured to insert said bottom portion.

10. The wheel attachment for tamper of claim 1, wherein said fastener base is a support base for said bottom portion of said tamper.

11. A wheel attachment for tamper, comprising:
- a wheeled axle assembly including an axle with a box section body, wherein said wheeled axle includes bearings attached on each side thereof and at least one of the wheels is attached on one of said bearings, said wheels include tires wherein at least one of the tires is attached on at least one of the wheels;
- a handle assembly including a handle, wherein said handle includes a hollow rectangular body, said handle is attached on said wheeled axle, fastener base is perpendicularly attached to said handle, said wheeled axle and said fastener base define a rectangular hollow portion, said wheeled axle is configured to support said tamper by tires wherein the tamper is inserted through said rectangular hollow portion defined by said fastener base and said wheeled axle; and
- a tamper assembly including a tamper, wherein said tamper has a bottom portion, said bottom portion is attached to said fastener base and said handle; wherein the rectangular hollow portion has a configuration matching the tamper bottom portion to securely hold the tamper in position.

12. The wheel attachment for tamper of claim 11, wherein at least one of the bearing portion is concentrically attached to at least one of the wheels to connect each side of the wheeled axle to said wheel through said bearings.

13. A wheel attachment for tamper, consisting of:
- a wheeled axle assembly including an axle, wherein said wheeled axle includes bearings attached on each side thereof and at least one of the wheels is attached on one of said bearings, said wheels include tires wherein at least one of the tires is attached on at least one of the wheels, at least one of said wheels has concentrically attached a bearing portion to connect each side of said wheeled axle, said wheeled axle configured to further transport a tamper by a fastener base and a handle;
- a handle assembly including said handle, wherein said handle has a hollow rectangular body which extends outwardly from said wheeled axle from a central portion, said handle is attached on said wheeled axle being perpendicular to a fastener base, said fastener base is perpendicularly attached to said handle and configured to insert a bottom portion of a tamper which is held by said wheeled axle said wheeled axle and said fastener base define a rectangular hollow portion, said wheeled axle is configured to support said tamper by tires wherein the tamper is inserted through said rectangular hollow portion defined by said fastener base and said wheeled axle; and
- a tamper assembly including said tamper mounted to said wheeled axle, said bottom portion is attached between said fastener base and said wheeled axle; wherein the rectangular hollow portion has a shape specifically designed to match the tamper bottom portion for secure retention during transportation.

* * * * *